(12) United States Patent
Cheng et al.

(10) Patent No.: US 10,009,892 B2
(45) Date of Patent: Jun. 26, 2018

(54) LISTEN-BEFORE-TALK OPERATION WITH FREEZE INTERVAL

(71) Applicant: Telefonaktiebolaget L M Ericsson (publ), Stockholm (SE)

(72) Inventors: Jung-Fu Cheng, Fremont, CA (US); Sorour Falahati, Stockholm (SE); Laetitia Falconetti, Aachen (DE); Bruhtesfa Godana, Kista (SE); Du Ho Kang, Sollentuna (SE); Havish Koorapaty, Saratoga, CA (US); Daniel Larsson, Vallentuna (SE); Yu Yang, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 103 days.

(21) Appl. No.: 14/660,671

(22) Filed: Mar. 17, 2015

(65) Prior Publication Data

US 2016/0278078 A1    Sep. 22, 2016

(51) Int. Cl.
*H04W 72/04* (2009.01)
*H04W 74/08* (2009.01)
(Continued)

(52) U.S. Cl.
CPC ... *H04W 72/0446* (2013.01); *H04W 74/0808* (2013.01); *H04W 16/14* (2013.01); *H04W 84/12* (2013.01)

(58) Field of Classification Search
CPC ......... H04W 72/0446; H04W 74/0909; H04W 84/12
(Continued)

(56) References Cited

U.S. PATENT DOCUMENTS

2015/0071060 A1    3/2015  Bhushan et al.
2015/0341921 A1*  11/2015  Chen ................. H04W 72/0413
                                                                370/330
(Continued)

FOREIGN PATENT DOCUMENTS

WO          2006109213 A1    10/2006
WO     WO 2016081375 A1 *  5/2016  ............ H04W 74/08

OTHER PUBLICATIONS

Cisco Systems, "Simulation results for Coexistence of LAA and Wi-Fi", 3GPP TSG RAN WG1 #80 R1-150134, Agenda item: 7.2.3.1 Athens, Greece, Jan. 31, 2015, 1-13.
(Continued)

*Primary Examiner* — Gregory Sefcheck
*Assistant Examiner* — Majid Esmaeilian
(74) *Attorney, Agent, or Firm* — Sage Patent Group

(57) ABSTRACT

There is disclosed a method for operating a radio node for a wireless communication network, the radio node being adapted for transmitting communication data on at least one carrier based on a timing relative to a pre-defined time structure. The method comprises defining at least one freeze interval relative to the pre-defined time structure, performing a Listen-Before-Talk, LBT, procedure to determine whether accessing the at least one carrier for transmission is allowed, and, if accessing the at least one carrier for transmission is determined to be allowed based on performing the LBT procedure, starting transmission of communication data on the at least one carrier outside the at least one freeze interval. There are also disclosed a corresponding node, system, program product and storage medium.

14 Claims, 16 Drawing Sheets

(51) Int. Cl.
*H04W 16/14* (2009.01)
*H04W 84/12* (2009.01)

(58) Field of Classification Search
USPC .......................................................... 370/336
See application file for complete search history.

(56) References Cited

U.S. PATENT DOCUMENTS

2016/0057770 A1* 2/2016 Yerramalli ........... H04B 7/0811
370/329
2016/0242186 A1* 8/2016 Nissila .............. H04W 72/0486

OTHER PUBLICATIONS

Ericsson, "Details of Listen-Before-Talk for LAA", 3GPP TSG RAN WG1 Meeting #79 R1-145193 San Francisco, USA, Nov. 13, 2014, 1-7.

Orfanos, Georgios et al., "A Centralized MAC Protocol with QOS Support for Wireless LANS", 18th Annual IEEE International Symposium on Personal, Indoor and Mobile Radio Communications (PIMRC), 2007, 1-5.

3GPP, "3rd Generation Partnership Project; Technical Specification Group Radio Access Network; Evolved Universal Terrestrial Radio Access (E-UTRA); Physical channels and modulation (Release 11)", 3GPP TS 36.211 V11.4.0, Sep. 2013, 1-120.

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.4.0, Sep. 2013, 1-182.

3GPP, "3rd Generation Partnership Project; Technical Specification Group Radio Access Network; Evolved Universal Terrestrial Radio Access (E-UTRA); Radio Resource Control (RRC); Protocol specification (Release 11) The present", 3GPP TS 36.331 V11.5.0, Sep. 2013, 1-347.

* cited by examiner

LISTEN-BEFORE-TALK OPERATION WITH FREEZE INTERVAL

TECHNICAL FIELD

This disclosure pertains to Listen-Before-Talk based access to carriers in wireless communication networks, in particular in the context of mobile telecommunication.

BACKGROUND

In wireless communication system utilizing unlicensed spectra, like WLAN (Wireless Local Area Network), before transmitting data, a node usually has to perform a Listen-Before-Talk (LBT) procedure to determine whether the carrier (of the unlicensed spectrum used) it wants to access is available for use. In contrast, many mobile communication systems used licensed spectra, and do not utilize such LBT procedures, as the access to the carriers is strongly controlled by the network, respectively base station. However, current developments in mobile telecommunications allow the use of unlicensed spectra for increased data throughput, in particular in addition to licensed spectra, e.g. in the context of carrier aggregation (CA).

In typical deployments of WLAN, e.g. according to Wifi, carrier sense multiple access with collision avoidance (CSMA/CA) is used for medium access. This means that the channel or carrier is sensed to perform a clear channel assessment (CCA), and a transmission is initiated only if the channel or carrier is declared as idle. In case the channel or carrier is declared as Busy, the transmission is essentially deferred until the channel is deemed to be Idle. When the range of several APs (Access Points, e.g. WLAN node) using the same frequency overlap, this means that all transmissions related to one AP might be deferred in case a transmission on the same carrier or frequency to or from another AP which is within range can be detected. Effectively, this means that if several APs are within range, they will have to share the channel or carrier in time, and the throughput for the individual APs may be severely degraded. A general illustration of this listen before talk (LBT) mechanism is shown in FIG. 1.

After a Wifi station (as an example of a WLAN node) A transmits a data frame to a station B, station B shall transmit an ACK frame (Acknowledgement frame) back to station A with a delay of 16 µs. Such an ACK frame is transmitted by station B without performing a LBT operation. To prevent another station interfering with such an ACK frame transmission, a station shall defer for a duration of 34 µs (referred to as DIFS) after the channel is observed to be occupied before assessing again whether the channel is occupied.

Therefore, a station that wishes to transmit, first performs a CCA (Clear Channel Assessment) by sensing the medium (carrier or channel) for a fixed duration DIFS. If the medium is idle, then the station assumes that it may take ownership of the medium (comprising accessing and/or transmitting) and begin a frame exchange sequence. If the medium is busy, the station waits for the medium to go idle, defers for DIFS, and waits for a further random backoff period.

To further prevent a station from occupying the channel or carrier continuously and thereby prevent other stations from accessing the channel or carrier, it is required for a station wishing to transmit again after a transmission is completed to perform a random backoff.

The PIFS is used to gain priority access to the medium, and is shorter than the DIFS duration. Among other cases, it can be used by STAs operating under PCF (Point coordination Function), to transmit Beacon Frames with priority. At the nominal beginning of each Contention-Free Period (CFP), the PC shall sense the medium. When the medium is determined to be idle for one PIFS period (generally 25 µs), the PC shall transmit a Beacon frame containing the CF Parameter Set element and a delivery traffic indication message element.

In the above basic protocol, when the medium becomes available, multiple Wi-Fi stations may be ready to transmit, which can result in collision. To reduce collisions, stations intending to transmit select a random backoff counter and defer for that number of slot channel idle times. The random backoff counter is selected as a random integer drawn from a uniform distribution over the interval of [0, CW]. The default size of the random backoff window, CWmin, is set in the IEEE specs. Note that collisions can still happen even with this random backoff protocol when they are many stations contending for the channel access. Hence, to reduce continuous collisions, the backoff window size CW is doubled whenever the station detects a collision of its transmission up to a limit, CWmax, also set in the IEEE specs. When a station succeeds in a transmission without collision, it resets its random backoff window size back the default value CWmin.

In the context of the expected increase in use of wireless devices and, in particular, the use of unlicensed spectra for mobile communication, the LBT procedure used for WLAN is unlikely to ensure fair access for all nodes wanting access to certain carriers or channels, in particular in an unlicensed spectrum.

SUMMARY

An object of this disclosure is to describe approaches providing fair access to carriers using LBT procedures, in particular in the context of a mobile telecommunications technology or system, which may be using licensed and/or unlicensed spectra, e.g. according to LTE.

There is disclosed a method for operating a radio node for a wireless communication network. The radio node may be adapted for transmitting communication data on at least one carrier based on a timing relative to a pre-defined time structure. The method may comprise defining at least one freeze interval relative to the pre-defined time structure and performing a Listen-Before-Talk, LBT, procedure to determine whether accessing the at least one carrier for transmission is allowed. The method may also comprise, if accessing the at least one carrier for transmission is determined to be allowed based on performing the LBT procedure, starting transmission of communication data on the at least one carrier outside the at least one freeze interval.

There is also disclosed a radio node for a wireless communication system, the radio node being adapted for transmitting communication data on at least one carrier based on a timing relative to a pre-defined time structure. The radio node may further be adapted for defining at least one freeze interval relative to the pre-defined time structure, and for performing a Listen-Before-Talk, LBT, procedure to determine whether transmission of communication data on the at least one carrier is allowed. Moreover, the radio node may be adapted for starting transmission of communication data on the at least one carrier outside the at least one freeze interval if transmission of communication data on the at least one carrier is determined to be allowed based on performing the LBT procedure.

In addition, there is disclosed a wireless communication system comprising at least one radio node as described herein and/or adapted for performing any one of the methods described herein.

There is also disclosed a computer program product comprising computer program instructions or code executable by control circuitry, the code causing the control circuitry to control and/or perform any one of the methods described herein.

Moreover, storage medium storing a computer program product described herein is disclosed. Here, the storage medium is a non-transitory storage medium, which does not necessarily mean permanent or unchanging storage for the computer program product, but which does mean storage of at least some persistence and excludes merely propagating signals. Non-limiting examples include non-volatile storage and volatile storage, such as working memory for program execution.

With the approaches shown, the access to carriers based on a LBT procedure may be fairer distributed in particular in systems with a large number of nodes wanting access. Moreover, the access of nodes to the carrier is easier to predict for other nodes (e.g., for reception), as it is well-defined in relation to a pre-defined time structure. In particular, fair coexistence operations between co-channel LAA and Wi-Fi when there are a large number of nodes contending for carrier access may be facilitated. Introduction of the freeze interval for a transmitting radio node increases the opportunities for other contending nodes to access the carrier and allows power savings of the corresponding receiving nodes due to the fact that the transmitting node remains idle during the freeze interval, allowing the receiving nodes to start receiving based on the freeze interval.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
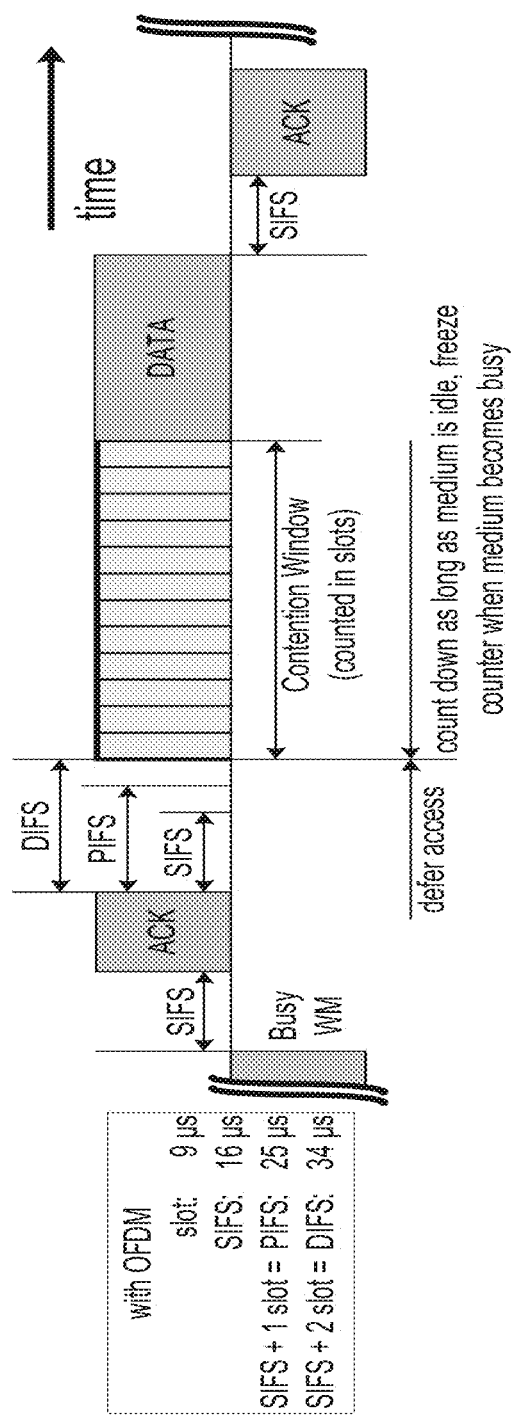
FIG. 1 shows an example of a WLAN LBT-procedure.

In the context of this specification, a wireless communication network may comprise one or more (radio) nodes or devices adapted for wireless and/or radio communication, in particular according to a pre-determined standard like LTE. It may be considered that one or more radio nodes are connected or connectable to a core network and/or other network nodes of the network, e.g. for transmission of data and/or control. A wireless communication system may comprise at least one radio node (which may be a base station or eNodeB), which may be connected or connectable to a core network, and/or may comprise and/or provide control functionality and/or at least one corresponding control node, e.g. for mobility management and/or data packet transmission and/or charging-related functionality.

A radio node may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier in the following), e.g. an unlicensed carrier. It may be considered that the carrier is part of a carrier aggregate. A carrier aggregate may generally comprise a plurality of carriers, wherein one carrier may be a primary carrier and/or other carriers may be secondary carriers. It may be considered that carriers of a carrier aggregate are synchronized according to a pre-defined time structure and/or in relation to a synchronizing carrier, which may be a primary carrier. A primary carrier may be a carrier on which control information and/or scheduling data is transmitted and/or which carries one or more control channels for the carrier aggregate and/or one or more carriers. A carrier aggregate may comprise UL carrier/s and/or DL carrier/s. A carrier aggregate may comprise one or more LBT carriers. It may be considered that a carrier aggregate additionally comprises one or more carriers for which no LBT procedure for access is performed, e.g. licensed carriers. A primary carried may be such a carrier, in particular a licensed carrier. Accordingly, in some variants a carrier for which LBT is performed may be in a carrier aggregate comprising at least one carrier for which no LBT is performed, in particular a licensed carrier. A licensed carrier may generally be a carrier licensed for a specific Radio Access Technology (RAT), e.g. LTE. A radio node may in particular be a user equipment or a base station and/or relay node and/or micro-(or pico/femto/nano-) node of or for a network, e.g. an eNodeB. Transmission of data may be in uplink (UL) for transmissions from a user equipment to a base station/node/network. Transmission of data may be considered in downlink (DL) for transmission from a base station/node/network to a user equipment. The target of transmission may generally be another radio node, in particular a radio node as described herein.

Communication data may be data intended for transmission. It may be considered that communication data comprises, and/or is of, one or more types of data. One type of data may be control data, which in particular may pertain to scheduling and/or measurements and/or configuring of radio nodes. Another type of data may be user data. Communication data may be data to be transmitted, which may be stored in a data buffer of the radio node for transmission.

There is disclosed a method for operating a radio node, which may be a radio node for a wireless communication network. The radio node may be adapted for transmitting communication data on at least one carrier based on a timing relative to a pre-defined time structure. The method comprises defining at least one freeze interval relative to the pre-defined time structure and performing a Listen-Before-Talk, LBT, procedure to determine whether accessing the at least one carrier for transmission is allowed, and, if accessing the at least one carrier for transmission is determined to be allowed based on performing the LBT procedure, starting transmission of communication data on the at least one carrier outside the at least one freeze interval.

There is also disclosed a radio node for a wireless communication system, the radio node being adapted for, and/or comprise a transmitting module for, transmitting communication data on at least one carrier based on a timing relative to a pre-defined time structure, the radio node further being adapted for, and/or comprising a defining module for, defining at least one freeze interval relative to the pre-defined time structure, and being adapted for, and/or comprising a LBT module for, performing a Listen-Before-Talk, LBT, procedure to determine whether transmission of communication data on the at least one carrier is allowed, as well as being adapted for, and/or comprise a starting module for, starting transmission of communication data on the at least one carrier outside the at least one freeze interval if transmission of communication data on the at least one carrier is determined to be allowed based on performing the LBT procedure.

The carrier may be a carrier of a carrier aggregate, in particular a secondary carrier. Alternatively or additionally, the carrier may be a LBT carrier and/or an unlicensed carrier. The term LAA (Licensed-Assisted Access) may generally refer to a carrier aggregation in which the primary carrier is a licensed carrier and at least one unlicensed carrier is a secondary carrier. Generally, the radio node may be adapted for LAA, and/or the carrier may be a secondary carrier of a LAA-CA.

A freeze interval may be a subdivision of the pre-defined time structure, which may have a smaller duration of than the pre-defined time structure. Generally, a freeze interval may be an interval in which no transmission of communication data may be started. However, after the transmission has started, it may be carried on during following freeze intervals.

A pre-defined time structure may generally be a time structure having a pre-defined duration and/or comprising (e.g. a fixed number of) units or intervals of fixed duration, e.g. slots and/or symbols and/or subframes and/or frames. A pre-defined time structure may in particular be defined to synchronize a network and/or one or more radio node/s and/or one or more carrier/s, in particular the carrier of a carrier aggregate (CA). In particular, the timing of one or more carriers may be synchronized according to the pre-defined time structure. Generally, a radio node may be configured to operate and/or follow a timing according to the pre-defined time structure. The pre-defined time structure may be according to a standard used, e.g. LTE, and/or may be provided and/or controlled by the network (for example, a base station), e.g. via corresponding signaling. A transmission interval may be a time interval in which transmission of communication data may be started, e.g. at a starting time unit and/or within a transmission start interval, and be ended, e.g. at the end of the transmission interval. The transmission interval may comprise one or more instances of a time structure, in particular one or more subframes. Alternatively or additionally, a transmission interval may comprise one or more freeze intervals and/or one or more transmission start intervals, e.g. pertaining to each subframe and/or one or more of the subframes. Generally, a pre-defined time structure may be synchronized and/or provided by a network and/or may be an externally determined timing (e.g. determined by or within the network).

A LBT procedure may comprise one or more Clear Channel Assessment (CCA, may also be called Clear Carrier Assessment) procedures—A CCA procedure may generally comprise sensing and/or determining the energy and/or power received on or for the channel or carrier (by the radio node) the LBT procedure is performed on over a time interval or duration, which may be called the CCA interval or duration. Generally, different CCA procedures may have different CCA intervals or durations, e.g. according to a configuration. The number of CCA procedure to be performed for a LBT procedure may be dependent on a random backoff counter. A CCA may indicate that a carrier or channel is idle if the power and/or energy sensed or determined is below a threshold, which may be a pre-determine threshold and/or be determined by the radio node, e.g. based on operating conditions and/or a configuration; if it is above or reaching the threshold, the carrier or channel may be indicated to be busy). A LBT procedure may be considered to determine that access to a carrier is allowed based on a number (e.g. a pre-determined number, e.g. according to a random backoff counter) of CCAs performed indicating that the carrier or channel is idle. In some cases, the number may indicate a number of consecutive indications of the carrier being idle. It may be generally considered that the radio node is adapted for such sensing and/or determining and/or for carrying out CCA, e.g. by comprising suitable sensor equipment and/or circuitry and/or a corresponding sensing module. Such a sensing module may be part of and/or be implemented as or in a LBT module. Performing a LBT procedure to determine whether accessing a carrier or channel is allowed may include performing one or more CCA procedures on that carrier or channel.

Defining a time interval (e.g. a transmission start interval or freeze interval) relative to the pre-defined time structure may generally comprise defining in which instance of a time unit of the structure (e.g. subframe) and/or of the time structure the interval is located and/or in which part of the time unit (e.g. subframe) and/or time structure the interval is located. Defining a time interval may be performed once for a plurality of LBT procedures and/or be valid for an arbitrary duration, which may be determined by the radio node and/or the defining module.

It may be generally considered that defining at least one freeze interval relative to the pre-determined time structure includes defining any one or any combination of at least one transmission start interval and/or at least one a CCA budget (or corresponding interval for CCA) and/or at least one starting time unit, the latter of which may be inside a transmission start interval.

Generally, the pre-defined time structure may comprise and/or be and/or define a subframe, e.g. as a time unit. A subframe may comprise one or more time subunits, e.g. symbols.

The radio node may be adapted for, and/or comprise a transmission defining module for, and/or the method may comprise, defining at least one transmission start interval relative to the pre-defined time structure, wherein optionally the radio node may further be adapted for, and/or the starting module may be adapted for, starting transmission of communication data inside the transmission start interval.

The time structure may be repetitive, e.g. repeating subframes, wherein optionally the arrangement of intervals within a time structure may differ between repetitions. In particular, the timing of or for the radio node and/or the carrier may be defined and/or according to a chain of consecutive time units like subframes and/or pre-defined time structures. Generally, a transmission interval or transmission duration may be chosen such that its end coincides with the end of a time unit of the pre-determined time interval, e.g. a subframe, and/or that it is equal or smaller in duration to a maximum transmission time interval, which may be defined by regulations, and e.g. be 4, 9 or 13 ms.

Starting transmission of communication data may include transmitting the communication data, e.g. from a starting point in time, e.g. a symbol or slot, which may be within a transmission start interval. After the start, communication data may be transmitted within a transmission interval (which may also be called transmission duration), e.g. a maximum duration for transmission, which may be called TXOP. Such may be defined by regulations for accessing and/or transmitting on the carrier. Transmitting the communication data may be performed over a duration covering more than one instances of the time structure, e.g. up to 4, 9 or 13 instances, e.g. sub-frames.

The LBT procedure may comprise a number of Clear Channel Assessments or CCA procedures, wherein the number may be larger than one and/or be based on a random backoff number or counter. Generally, CCA procedures and/or an LBT procedure may be performed during a freeze interval.

In a refinement, the radio node may be adapted for, and/or comprise a delaying module for, and/or the method may comprise, delaying starting transmission of communication data on the at least one carrier if accessing the at least one carrier is determined to be allowed based on performing the LBT procedure during the freeze interval, in particular delaying until a transmission start interval is reached. The transmission start interval may be a transmission start interval of the pre-defined time structure (and/or an instance of a subframe) following the time structure (and/or instance of a subframe) the freeze interval is associated to and/or defined for. Delaying may be performed such that starting transmission is delayed until the beginning of the next subframe. Delaying may comprise performing a starting CCA procedure before starting the transmission of communication data, in particular to end and/or when ending the delay, and/or after the LBT procedure has been performed, and/or before and/or abutting a transmission start interval. Such a starting CCA procedure may be independent of the LBT procedure and/or be performed even if accessing the carrier has been determined to be allowed based on the LBT procedure. The CCA interval of the starting CCA procedure may be shorter than the CCA interval/s of at least one (in particular the first or all) CCA procedure/s of the LBT procedure. Starting the transmission and/or ending the delay may be based on the starting CCA procedure indicating a clear carrier and/or the carrier being idle. Starting CCAs may be repeated (e.g. according to a pre-determined or configured scheme) until it is determined to be idle before transmission of communication data is started.

The radio node may be adapted for, and/or comprise an occupying module for, and/or the method may comprise, occupying the carrier if accessing the at least one carrier is determined to be allowed based on performing the LBT procedure during the freeze interval. Occupying a carrier may comprise transmitting on the carrier, e.g. an initial signal and/or filling signals and/or at a pre-determined energy or power level, e.g. such that other radio nodes performing LBT may determine the carrier to be busy and/or not be allowed to transmit. Such occupying may be performed until starting transmission of communication data is performed and may generally utilize signals not belonging or representing communication data.

The pre-defined time structure is synchronized for more than one carrier, in particular the at least one carrier the LBT procedure is performed on and/or for, and/or a primary carrier of a CA.

Defining an interval, e.g. a freeze interval or transmission start interval, may comprise receiving corresponding data, e.g. from a network or network node, e.g. via control information or data. Alternatively or additionally, defining an interval like a freeze interval or transmission start interval may comprise determining the interval, e.g. based on operation conditions and/or based on pre-defined information, e.g. information or data read from a storage or memory of the radio node. A radio node which is a base station may configure, and/or be adapted for configuring, and/or comprise a configuring module for configuring, a radio node with a freeze interval and/or a transmit interval.

Figure 2:
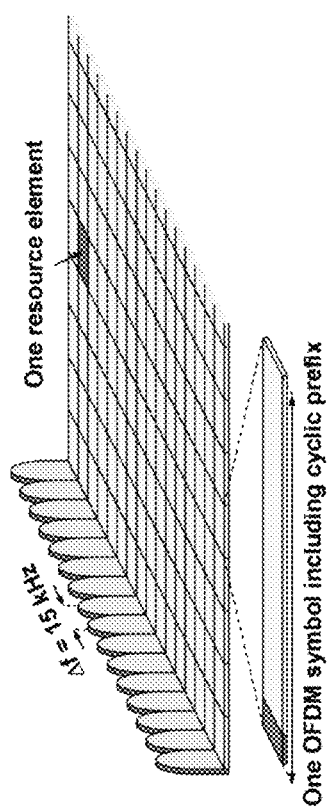
FIG. 2 shows an example of an LTE downlink resource block.

LTE uses OFDM in the downlink and DFT-spread OFDM (also referred to as single-carrier FDMA) in the uplink. The basic LTE downlink physical resource can thus be seen as a time-frequency grid as illustrated in FIG. 2, where each resource element corresponds to one OFDM subcarrier during one OFDM symbol interval. A carrier may comprise the number of subcarriers, e.g. 12 subcarriers. The uplink subframe has the same subcarrier spacing as the downlink and the same number of SC-FDMA symbols in the time domain as OFDM symbols in the downlink.

Figure 3:
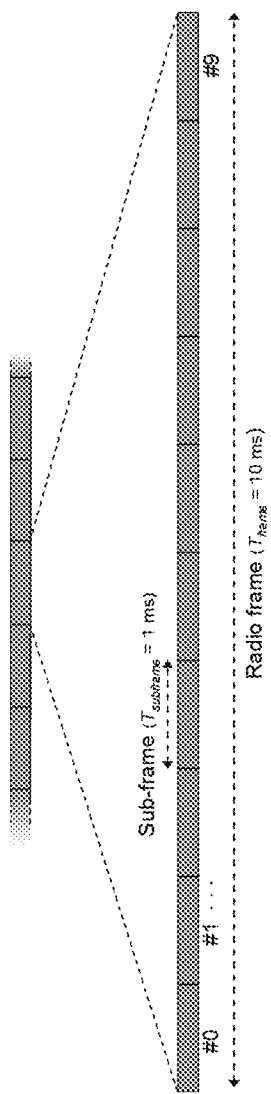
FIG. 3 shows an example of a pre-defined time structure.

As indicated in FIG. 3, in the time domain, LTE downlink transmissions are organized into radio frames of 10 ms, each radio frame consisting of ten equally-sized subframes of length Tsubframe=1 ms. For normal cyclic prefix, one subframe consists of 14 OFDM symbols. The duration of each symbol is approximately 71.4 μs. Thus, LTE provides a pre-defined time structure comprising subframes and/or frames and/or symbols as time units/intervals. The timing of the radio node/s in a wireless communication network, and/or the carrier/s, in particular according to LTE, may be maintained and/or defined relative to this time structure, which is provided and/or (pre-) defined by the network, e.g. a base station and/or a higher-level node or core network, e.g. relative to a reliable time source like a GPS signal and/or advance clock, e.g. an atomic clock.

Furthermore, the resource allocation in LTE is typically described in terms of resource blocks, where a resource block corresponds to one slot (0.5 ms, an example of another time unit/interval of the time structure) in the time domain and 12 contiguous subcarriers in the frequency domain. A pair of two adjacent resource blocks in time direction (1.0 ms) is known as a resource block pair. Resource blocks may be numbered in the frequency domain, starting with 0 from one end of the system bandwidth.

Downlink transmissions are dynamically scheduled, i.e., in each subframe the base station transmits control information about which user equipments or terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 4.

From LTE Rel-11 onwards, these resource assignments can be scheduled on the enhanced Physical Downlink Control Channel (EPDCCH) and the Physical Downlink Control Channel (PDCCH). For Rel-8 to Rel-10, the Physical Downlink Control Channel (PDCCH) is available.

Figure 4:
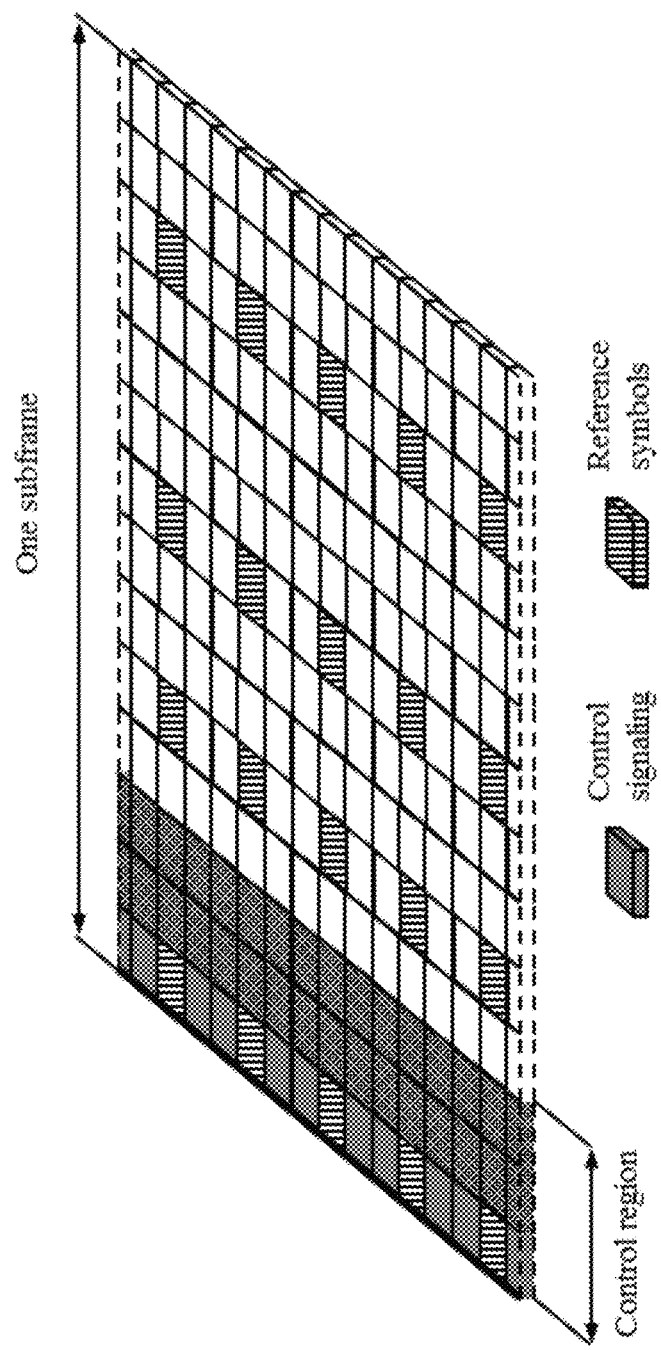
FIG. 4 shows a downlink control structure.

The reference symbols shown in FIG. 4 are the cell specific reference symbols (CRS) and may be used to support multiple functions including fine time and frequency synchronization (in particular, to determine the timing according to the pre-defined time structure) and/or channel estimation for certain transmission modes.

A control channel like the PDCCH/EPDCCH may be used to carry downlink control information (DCI) such as scheduling decisions and power-control commands. More specifically, the DCI may include:

Downlink scheduling assignments, including PDSCH resource indication, transport format, hybrid-ARQ information, and control information related to spatial multiplexing (if applicable). A downlink scheduling assignment may also include a command for power control of the PUCCH used for transmission of hybrid-ARQ acknowledgements in response to downlink scheduling assignments, and/or Uplink scheduling grants, including PUSCH resource indication, transport format, and hybrid-ARQ-related information. An uplink scheduling grant also may include a command for power control of the PUSCH (physical Uplink Shared Channel); and/or Power-control commands for a set of terminals as a complement to the commands included in the scheduling assignments/grants.

One PDCCH/EPDCCH may carry one DCI message containing one of the groups of information listed above. As multiple user equipments (UEs) and/or terminals can be scheduled simultaneously, and each can be scheduled on both downlink and uplink simultaneously, there must be a possibility to transmit multiple scheduling messages within each subframe. Each scheduling message is transmitted on separate PDCCH/EPDCCH resources, and consequently there are typically multiple simultaneous PDCCH/EPDCCH transmissions within each subframe in each cell. Furthermore, to support different radio-channel conditions, link adaptation can be used, where the code rate of the PDCCH/EPDCCH is selected by adapting the resource usage for the PDCCH/EPDCCH, to match the radio-channel conditions.

The LTE Rel-10 standard supports bandwidths larger than 20 MHz.

Figure 5:
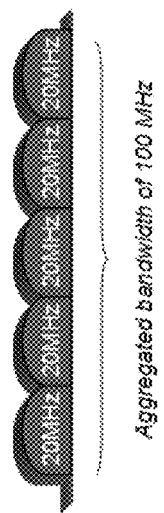
FIG. 5 shows a carrier aggregate.

One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier. CA is illustrated in FIG. 5. A CA-capable UE is assigned a primary cell (PCell) which is always activated and may comprise a primary carrier, and one or more secondary cells (SCells) which may be activated or deactivated dynamically and/or may comprise one or more secondary carriers, in particular LBT carrier/s.

The number of aggregated carriers (component carriers, CC) in a CA as well as the bandwidth of the individual CC may be different for uplink and downlink. A symmetric configuration refers to the case where the number of CCs in downlink and uplink is the same whereas an asymmetric configuration refers to the case that the number of CCs is different. The number of carriers/CCs configured in a cell may be different from the number of CCs seen by a UE/terminal: A UE/terminal may for example support more downlink CCs than uplink CCs, even though the cell is configured with the same number of uplink and downlink CCs.

In addition, carrier aggregation may provide the ability to perform cross-carrier scheduling. This mechanism allows a (E)PDCCH on one CC to schedule data transmissions on another CC by means of a 3-bit Carrier Indicator Field (CIF) inserted at the beginning of the (E)PDCCH messages. For data transmissions on a given CC, a UE expects to receive scheduling messages on the (E)PDCCH on just one CC—either the same CC, or a different CC via cross-carrier scheduling; this mapping from (E)PDCCH to PDSCH is also configured semi-statically. Such cross-carrier scheduling may be performed on a primary carrier.

Figure 6:
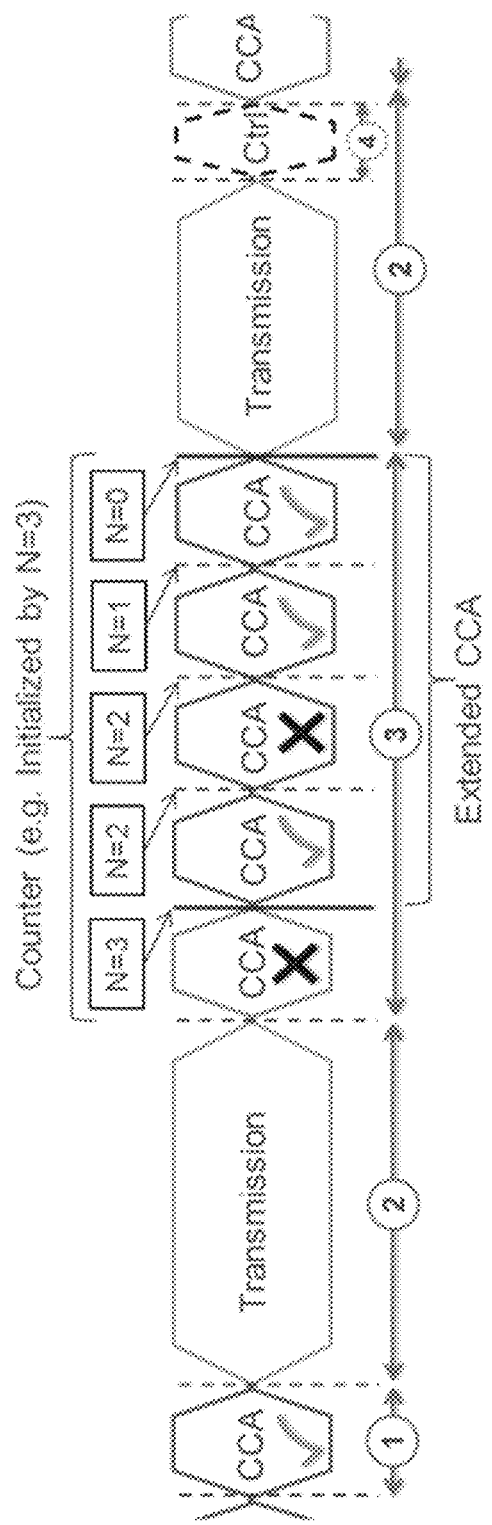
FIG. 6 shows a LBT procedure.

Generally, the following may be considered as an example for a LBT procedure. As shown in FIG. 6, it may be considered that before accessing a carrier or channel, in particular before a transmission or a burst of transmissions on the carrier or channel, a Clear Channel Assessment (CCA) procedure or check may be performed, e.g. using "energy detect" and/or sensing or determining the power or energy on the carrier or channel.

This may include observing or sensing or detecting for the duration of the CCA observation time (or CCA interval or duration), which may be at least 20 µs. The CCA observation time or interval used may be declared by the manufacturer of the radio node. The carrier or channel may be considered occupied ("Busy") if the energy/power level in the channel exceeds a threshold corresponding to the power level given below. If the carrier or channel is found to be clear ("Idle"), the carrier may be accessed immediately.

If the carrier or channel is occupied, the radio node shall not transmit in that carrier or channel. The radio node may perform an Extended CCA check in which the carrier or channel may be observed for the duration of a random factor N (random backoff number) multiplied by the CCA observation time or CCA interval. N may define the number of clear/idle slots (which may result) in a total Idle Period) that need to be observed before initiation (starting) of transmission. The value of N shall be randomly selected in the range 1 . . . q every time an Extended CCA is required and the value stored in a counter. The value of q is selected by the manufacturer in the range 4 . . . 32. This selected value shall be declared by the manufacturer. The counter is decremented every time a CCA slot is considered to be "unoccupied" or idle. When the counter reaches zero, the equipment may transmit.

The radio node may be allowed to continue Short Control Signalling Transmissions on this channel providing it complies with certain requirements.

For a radio node having simultaneous transmissions on multiple (adjacent or non-adjacent) carriers or channels, the radio node may continue transmissions on other carriers providing the CCA check did not detect any signals on those carriers.

The total time (transmission time or transmission interval) that a radio node may transmit on a carrier or channel is the Maximum Channel Occupancy Time or Maximum Occupancy time, which may be less than $(13/32) \times q$ ms, with q as defined above, after which the radio node may perform the Extended CCA/LBT procedure again. Generally, the total time a carrier is transmitted on (duration of the initial signal/signal for occupying the carrier plus time for transmission of communication data), may be equal to or less than a maximum occupancy time.

A radio node, upon correct reception of a packet which was intended for it, may skip CCA and immediately proceed with the transmission of management and control frames (e.g. ACK and Block ACK frames). A consecutive sequence of transmissions by the radio node, without it performing a new CCA/LBT procedure, may not exceed the Maximum Channel Occupancy Time.

For the purpose of multi-cast, the ACK transmissions (associated with the same data packet) of the individual devices are allowed to take place in a sequence As an example, the energy detection threshold for the CCA may be proportional to the maximum transmit power (PH) of the transmitter (radio node): for a 23 dBm e.i.r.p. transmitter the CCA threshold level (TL) may be equal or lower than −73 dBm/MHz at the input to the receiver (assuming a 0 dBi receive antenna). For other transmit power levels, the CCA threshold level TL may be calculated using the formula: TL=−73 dBm/MHz+23—PH (assuming a 0 dBi receive antenna and PH specified in dBm e.i.r.p.).

Up to now, the spectrum used by LTE is dedicated to LTE. This has the advantage that an LTE system does not need to care about coexistence with other non-3GPP radio access technologies in the same spectrum and spectrum efficiency can be maximized. However, the spectrum allocated to LTE is limited which cannot meet the ever increasing demand for larger throughput from applications/services. Therefore, a new study item has been initiated in 3GPP on extending LTE to exploit unlicensed spectrum in addition to licensed spectrum.

With Licensed-Assisted Access to unlicensed spectrum, as shown in 7, a UE is connected to a PCell in the licensed band/on a licensed carrier (primary carrier) and one or more SCells in the unlicensed band/on a unlicensed carrier. A secondary cell in unlicensed spectrum may be denoted as LAA secondary cell (LAA SCell). The LAA SCell may operate in DL-only mode or operate with both UL and DL traffic. Furthermore, in future scenarios the radio nodes may operate in standalone mode in license-exempt channels without assistance from a licensed cell. Unlicensed spectrum can, by definition, be simultaneously used by multiple different technologies. Therefore, the use of unlicensed carriers, in particular LAA as described herein, may consider coexistence with other systems.

Figure 7:
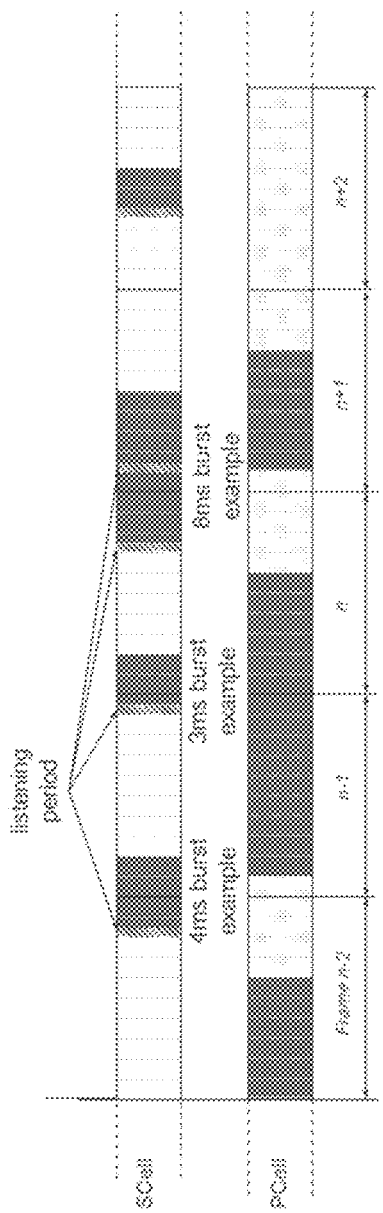
FIG. 7 shows a CA arrangement with LBT on a SCell.

To coexist fairly with the Wi-Fi system, transmission on the SCell shall conform to LBT protocols in order to avoid collisions and causing severe interference to on-going transmissions. This includes both performing LBT before commencing transmissions, and limiting the maximum duration of a single transmission burst (to a transmission interval). The maximum transmission burst duration is specified by country and region-specific regulations, for e.g., 4 ms in Japan and 13 ms according to EN 301.893. An example in the context of LAA is shown in FIG. 7 with different examples for the duration of a transmission burst on the LAA SCell constrained by a maximum allowed transmission duration of 4 ms.

Generally, the LBT procedure (which may be called load based LBT or load based LBT protocol) may be carried out for any carrier, in particular on a carrier for data transmissions that are carried for example on the PDSCH or PUSCH of an LAA transmitting node on SCell. In the load based LBT protocol, for a new LBT attempt a random number N may be drawn from a contention window, which may be used to initialize and/or determine a random backoff counter. The carrier or channel may be sensed to determine CCA idle slots. If an idle slot is detected, the random backoff counter is decremented. When the counter reaches zero, the transmission can immediately occur.

There may be introduced a time period during or after the LBT procedure in which no new transmission may be initiated. This time interval is referred to as the freeze period or freeze interval. The initial transmission (starting the transmission of communication data) due to the successful LBT (corresponding to access being allowed) hence occurs outside this time interval. There may be determined or defined a time budget or time interval for starting the transmission which may be referred to as the TX Start budget (or transmission start interval).

Generally, there may be defined (e.g. by the radio node and/or a corresponding defining module of the node), a time budget or time interval relative to the pre-defined time structure and/or a time unit thereof, e.g. a subframe, in which the CCA or LBT procedure may be performed, e.g. to detect the idle slots. This time interval or budget may be referred to as the CCA budget. The CCA budget may overlap with the freeze interval and/or a transmission start interval.

In case of the LBT protocol for an LAA transmitting node on SCell all the OFDM symbols (OS) within the TX Start budget or a subset of them can be considered as candidates for initiating the data transmission after a successful LBT. Fixed candidates for initiating the data transmission can reduce the complexity at the corresponding receiving node the data would be expected to start arriving in limited time instances.

Generally, there may be defined (e.g., by the radio node and/or a corresponding defining module of the node), one or more starting time units, which may in particular be symbols. The starting time units may be inside the transmission start interval (including its borders).

Figure 8:
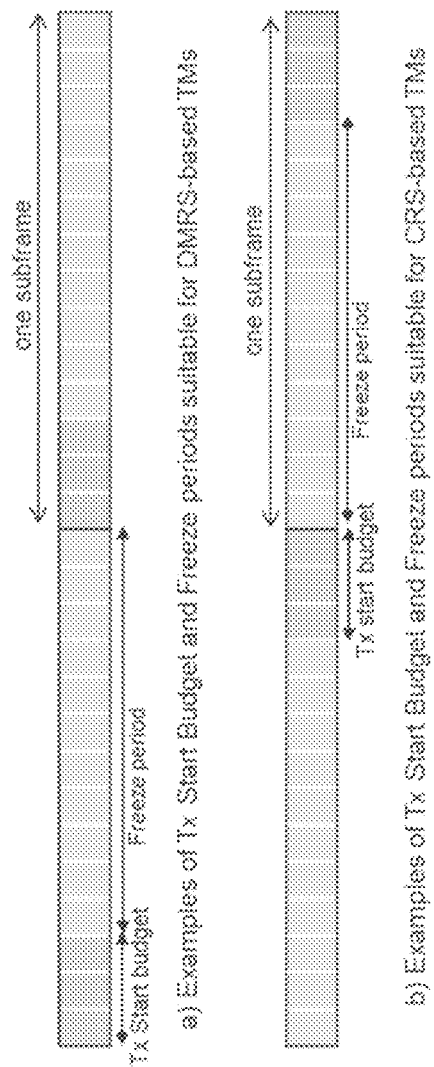
FIG. 8 shows examples of LBT parameters relative to a subframe.

The LBT parameters introduced here (freeze period, TX Start budget, CAA budget, starting time units like OS candidates for starting data transmissions from LAA nodes on SCells) may be configured or adaptively adjusted (determined), e.g. by a radio node, depending on various metrics or operation conditions, e.g.;

Based on a history of accessing the carrier, in particular the time since it started a LBT procedure, and/or the level of the starvations of an radio node like a LAA node in accessing the carrier or channel, e.g. if a node is starving, e.g. such that it hardly detects any idle slots for a long time to access the channel or carrier, it may be preferable to reduce the freeze period and/or reduce the limitation on the CCA budget and vice versa otherwise; and/or Based on the level of collisions (another node accessing the carrier at the same time as the node) experienced by the node, for example as the collision increases it may be preferable to increase the freeze period, and/or to limit the CCA budget and vice versa otherwise; and/or Based on the traffic load, for example if the load is low it may be preferable to reduce the freeze period and/or reduce the limitation on the CCA budget and vice versa otherwise; and/or Based on the applicable transmission modes in case of LBT at a radio node which is a LAA node; for example, if DMRS-based transmission modes are supported (by the node), a candidate for starting data transmission may be, and/or as a starting time unit may be determined the symbol OS#4, and/or the TX start budget/transmission start interval may be determined from OS#0 to OS#3 (as shown in FIG. 8a); alternatively, if CRS-based transmission modes are supported, a candidate for starting data transmission may be and/or as starting time unit may be determined the symbol OS#0, and/or the TX start budget/transmission start interval may be determined from OS#11 to OS#13 (see FIG. 8b); and/or Based on other system operation parameters or conditions, e.g. the number of UEs, the number of small cells on the frequency channel or carrier, the average received powers, the percentage of time the received energy is above a threshold.

The LBT parameters may be determined based on any one or any combination of these metrics or conditions or parameters. Additionally or alternatively, the LBT parameters may be determined or defined based on the type of communication data to be transmitted and/or based on QoS conditions, and/or there may be defined different LBT parameters for different types of data and/or QoS conditions. For example, a freeze interval or period may be defined to be different (in particular, shorter in duration) for control data than for user data. A set of LBT parameters (which may comprise any one or any combination of the parameters) may be associated to each type of data, wherein the parameters in the set may be defined or determined to differ.

Each of the LBT parameters introduced here (freeze period, TX Start budget, CAA budget, OS candidates for starting data transmissions from LAA nodes on SCells) can be configured or set based on one or combination of the above metrics to one value or several values in the course of each LBT attempt.

For example, a first freeze period can be the same as the second when it occurs or these two can be different. The changes can follow a pre-determined pattern from a set of patterns (where the set members may be the representative of possible scenarios, for example no congestion on the carrier or channel, medium congestion on the carrier or channel, and high congestion on the carrier or channel) or can be adaptive based on some rules.

The LBT parameters may be determine based on one or more weighting factors, and/or the starting time unit/s and/or OS candidates for starting data transmissions from LAA nodes on SCells may be determined based and/or in consideration of such weighting factors. For example, congestion may be determined e.g. by monitoring the changes in the random back-off counter, and/or an (possible average) time for the LBT procedure and/or number of CCA procedure necessary for accessing a carrier, e.g. in relation the (initial) random back-off counter for each LBT procedure.

Figure 9:
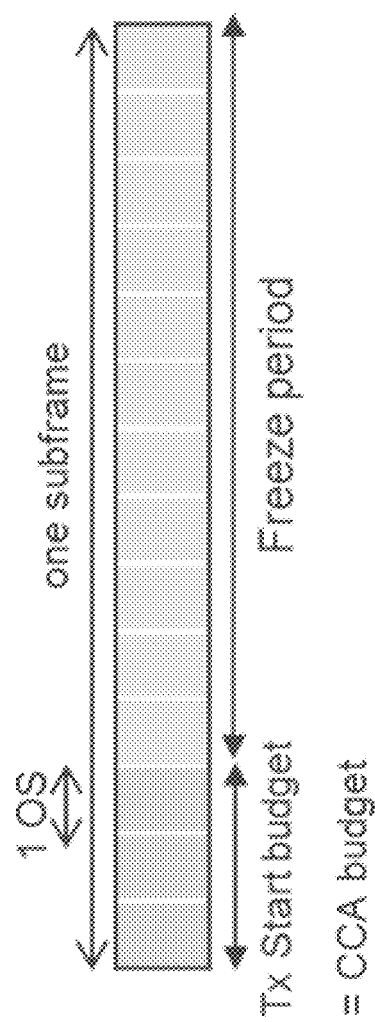
FIG. 9 shows a specific interval arrangement in a subframe.

In a first embodiment, a non-limiting example of the introduced LBT parameters setting for a radio node or LAA node is the following:

A fixed TX Start budget and CCA budget per subframe are determined or defined. An example for an corresponding subframe is shown in FIG. 9. In this example, the starting time unit is determined to be symbol #4, such that the transmission of communication data can start only from OFDM symbol#4 (OS#4).

Figure 10:
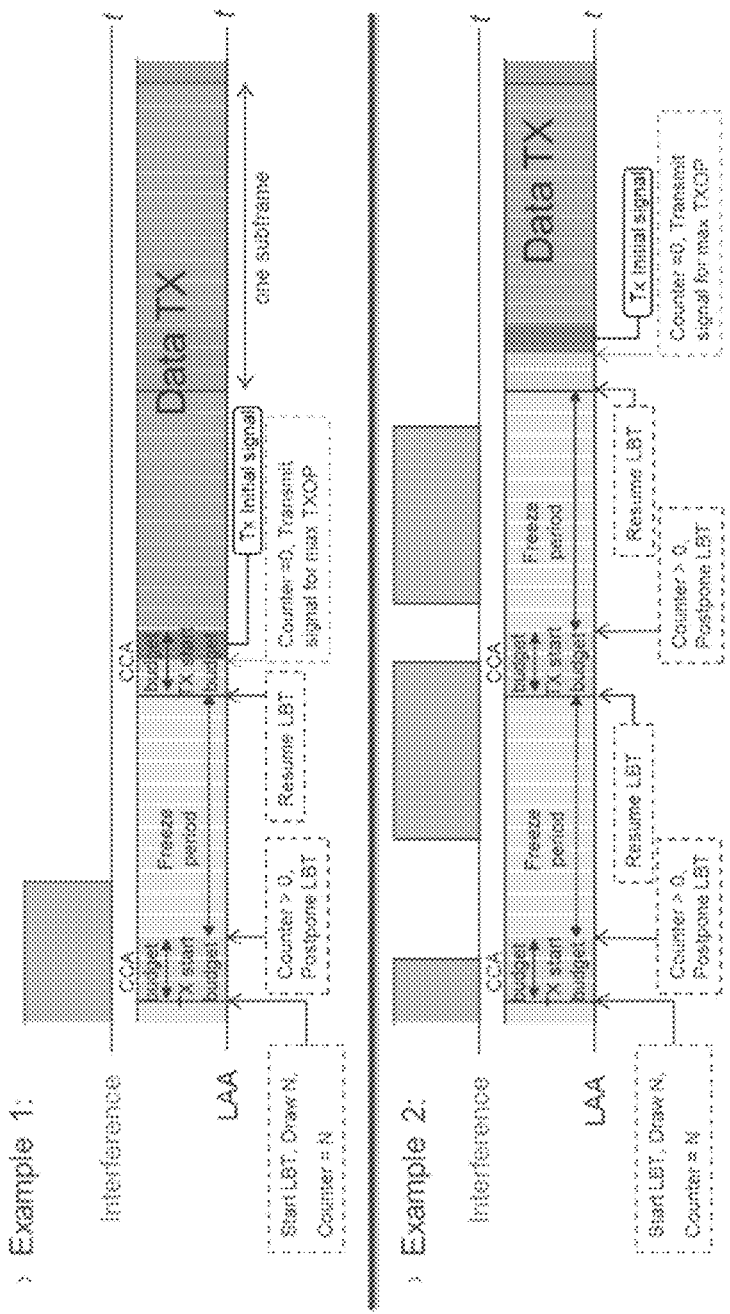
FIG. 10 shows examples of LBT procedures.

In this case, the LBT procedure can start anytime within the CCA budget. If LBT doesn't succeed within a CCA budget, (i.e. non-zero counter), the counter is frozen and LBT is postponed to the next CCA budget (in the repetition of subframes), to be resumed. The period the counter is frozen where no transmission can be initiated is referred to as the freeze period here. When LBT succeeds within a CCA budget, an initial signal (a signal not belonging to the communication data, for occupying the carrier) may be transmitted from the LBT success time to the closest candidates OS boundary for starting data transmission. In case the LBT succeeds at one of the candidates OS or starting time unit's boundary, the data is transmitted immediately without an initial signal (a signal not belonging to the communication data). FIG. 10 illustrates two examples for this setup.

In Example 1 of FIG. 10, the carrier is busy during the first CCA budget period. The random backoff counter is frozen and is resumed at the next CCA budget period. As illustrated in the example, the carrier may become idle during the outside the CCA budget period without being detected as such. In this example, the radio node observes enough number of idle slots and the random backoff counter is decremented to 0 during the second CCA budget period. The radio node can then transmit the initial signal and the data transmission.

Example 2 of FIG. 10 illustrates the embodiment in a more congested scenario, where the random backoff counter is frozen and resumed for a multitude of times.

Figure 11:
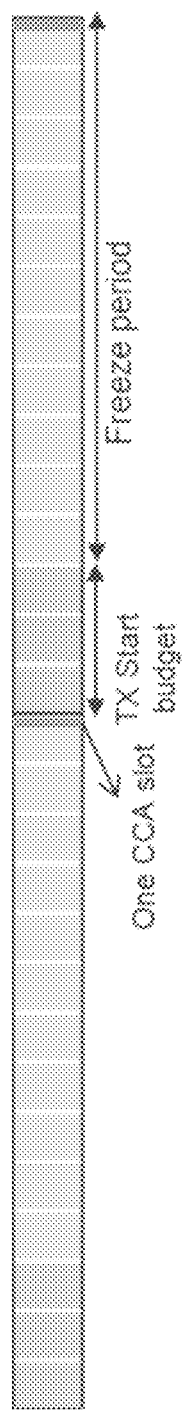
FIG. 11 shows another specific interval arrangement in a subframe.

In the second embodiment, a non-limiting example of the introduced LBT parameters setting for an LAA node is the following:

A fixed time budget for TX Start budget is defined, but no time limitation is imposed for CCA operation (the CCA budget may comprise the complete subframe). An example for an LAA subframe is shown in FIG. 11. In this example, the starting time unit may be defined to be OFDM symbol#0 (OS#0) or OS#4.

The LBT can start anytime. The CCA operation in the LBT procedure can continue until the random backoff counter reaches zero. The CCA operation may continue during the freeze periods as well.

If the counter reaches zero within a TX Start budget, the LBT is declared successful. When LBT succeeds within a CCA budget (e.g., inside a freeze period), an initial signal can be transmitted from the LBT success time to transmission start interval respectively the closest succeeding starting time unit or candidates OS boundary for starting data transmission. In case the LBT succeeds by the one of the candidates OS boundary for starting data transmission, the data is transmitted immediately without an initial signal.

If the counter reaches zero outside a TX Start budget, no transmission (of communication data) is initiated outside the TX Start budget. This interval is referred to as the freeze period.

Figure 12:
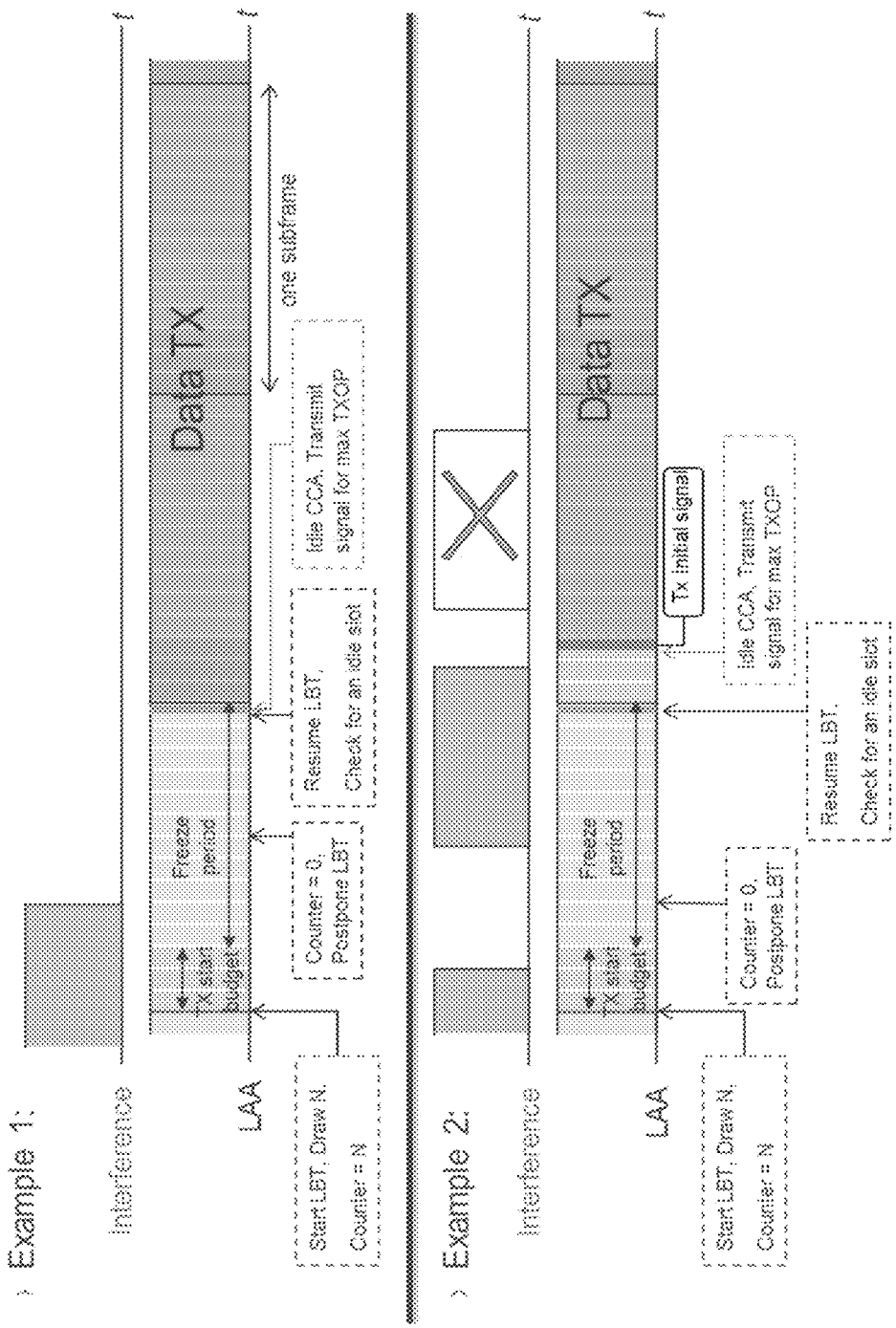
FIG. 12 shows examples of LBT procedures.

Starting the transmission may be delayed or postponed to the next TX Start budget and an additional (starting) CCA procedure may be performed to find an idle CCA slot by the next subframe boundary (in case a CCA slot is considered before TX Start budget for increasing efficiency which can have a different duration than other CCA slots), for example it can be as long as a DIFS or an AIFS period in Wi-Fi) or within the next TX Start budget to be declared successful. FIG. 12 illustrates two examples for this setup.

In another non-limiting variant, transmission of communication data is started at the next subframe boundary or allowed transmission starting time unit and/or beginning of the next transmission start interval or TX start budget.

Figure 13:
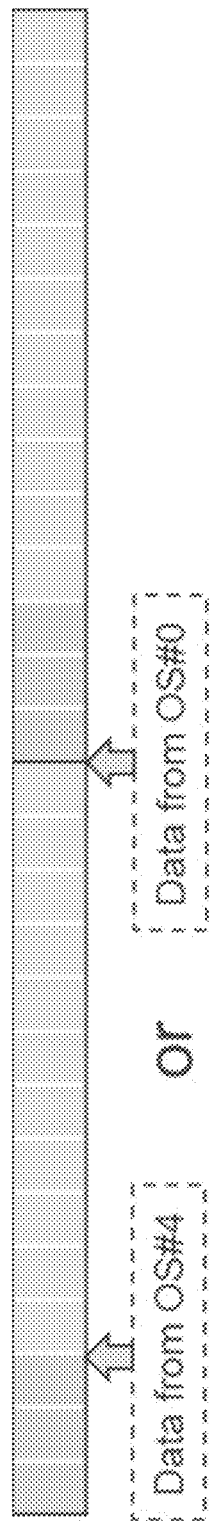
FIG. 13 shows another specific interval arrangement in a subframe.
Figure 14:
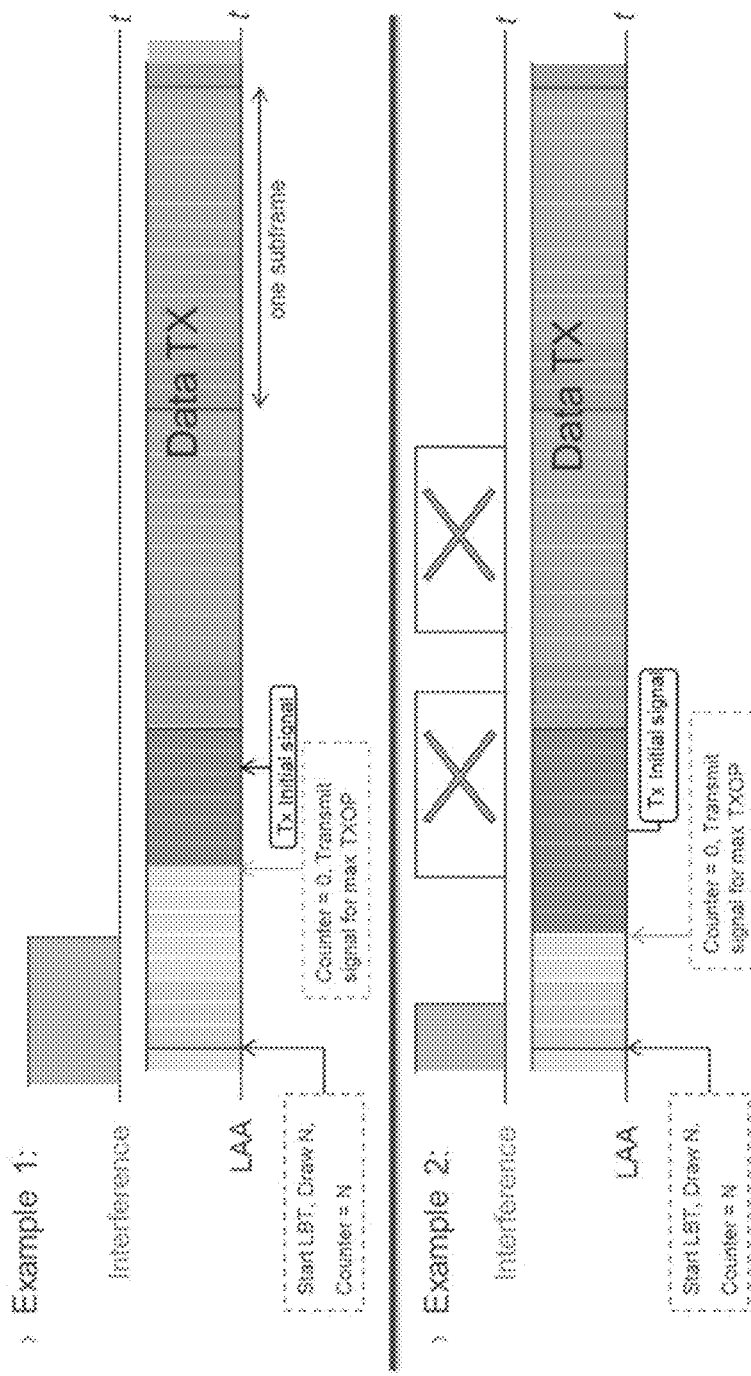
FIG. 14 shows examples of LBT procedures.

The introduced LBT parameters may be chosen such that no limitation is imposed on the TX start or CCA budgets which would result in no freeze period. In this example it is assumed that the data transmission can start only from OFDM symbol#0 (OS#0) or OS#4 as shown in FIG. 13. In this case, the LBT continues until is succeeds (i.e. zero counter). When the LBT succeeds within a subframe, an initial signal is transmitted from the LBT success time to the closest candidates OS boundary for data transmission. In case the LBT succeeds by the one of the candidates OS boundary for starting data transmission, the data is transmitted immediately without an initial signal. FIG. 14 illustrates two examples for this setup.

Different LBT parameters (i.e. freeze period, TX Start budget, CAA budget, OS candidates for starting data transmissions) may be maintained and adapted for different SCells.

In a second embodiment, the network can configure the transmission on a set of SCell to be considered together. For example, the network may configure a scheduling command to be applicable to a set of SCells simultaneously. For such case, the LBT parameters could be maintained and adapted for said set of SCells together.

According to this embodiment, different LBT parameters (i.e. freeze period, TX Start budget, CAA budget, starting time units like OS candidates for starting data transmissions) may be maintained and adapted for different quality of service (QoS) classes or importance classes or types of data. Non-limiting examples of QoS are voice conversation and video conferencing services. Higher layer control information is carried by PDSCH or PUSCH as data transmission but could be treated with higher importance to ensure correct system operation and control.

Figure 15:
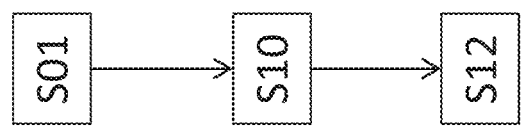
FIG. 15 shows a method for operating a radio node.

FIG. 15 shows a method for operating a radio node, e.g. a network node like a base station or user equipment as described herein. In S01 at least one freeze interval relative to the pre-defined time structure is defined. In action S10, a Listen-Before-Talk, LBT, procedure is performed to determine whether accessing the at least one carrier for transmission is allowed. If accessing the at least one carrier for transmission is determined to be allowed based on performing the LBT procedure, in action S12 transmission of communication data on the at least one carrier outside the at least one freeze interval is started.

Figure 16:
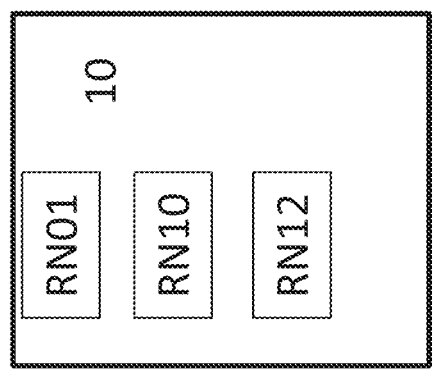
FIG. 16 shows a radio node.

FIG. 16 shows a radio node 10. The radio node 10 comprises a defining module RN01 for performing action S01, a LBT module RN10 for performing action S10 and a transmission start module RN12 for performing action S12.

Figure 17:
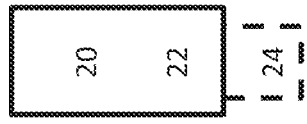
FIG. 17 shows a radio node.

FIG. 17 schematically shows a radio node 10, which may be implemented in this example as a user equipment or eNodeB. Radio node 10 comprises control circuitry 20. Radio node 10 also comprises radio circuitry 22 providing receiving and transmitting or transceiving functionality, the radio circuitry 22 being connected or connectable to the control circuitry 20. An antenna circuitry 24 may be connected or connectable to the radio circuitry 22, e.g. to collect or send and/or amplify signals. Radio circuitry 22 and the control circuitry 20 controlling it (and, e.g. the antenna circuitry) are configured for cellular communication with a network or a network node, in particular for transmitting on at least one carrier and to perform LBT and/or CCA procedures this carrier. The radio node 10 may be adapted to carry out any of the methods for operating a radio node disclosed herein; in particular, it may comprise corresponding circuitry, e.g. control circuitry. Modules or functionality of a radio node as described herein may be implemented in software and/or hardware and/or firmware in corresponding circuitry.

Generally, control circuitry may comprise integrated circuitry for processing and/or control, e.g. one or more processors and/or processor cores and/or FPGAs (Field Programmable Gate Array) and/or ASICs (Application Specific Integrated Circuitry), or other processing circuitry. Control circuitry may comprise and/or be connected to and/or be adapted for accessing (e.g. writing to and/or reading from) memory, which may comprise any kind of volatile and/or non-volatile memory, e.g. cache and/or buffer memory and/or RAM (Random Access Memory) and/or ROM (Read-Only Memory) and/or optical memory and/or EPROM (Erasable Programmable Read-Only Memory). Such memory may be adapted to store code executable by control circuitry and/or other data, e.g. data pertaining to communication, e.g. configuration/s and/or address data of nodes, etc. Control circuitry may be adapted to control any of the methods described herein and/or to cause such methods to be performed, e.g. by the radio node. Corresponding instructions may be stored in the memory, which may be readable and/or readably connected to the control circuitry.

Radio circuitry may comprise receiving circuitry (e.g. one or more receivers) and/or transmitting circuitry (e.g. one or more transmitters). Alternatively or additionally, radio circuitry may comprise transceiving circuitry for transmitting and receiving (e.g. one or more transceivers). It may be considered that radio circuitry comprises a sensing arrangement for performing LBT/CCA. Antenna circuitry may comprise one or more antennas or antenna elements, which may be arranged in an antenna array.

Configuring a radio node, in particular a user equipment, may refer to the radio node being adapted or caused or set to operate according to the configuration. Configuring may be done by another device, e.g. a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. regarding a freeze interval and/or a transmission start interval. A radio node may configure itself, e.g. based on configuration data received from a network or network node.

Generally, configuring may include determining configuration data representing the configuration and providing it to one or more other nodes (parallel and/or sequentially), which may transmit it further to the radio node (or another node, which may be repeated until it reaches the wireless device). Alternatively or additionally, configuring a radio node, e.g. by a network node or other device, may include receiving configuration data and/or data pertaining to configuration data, e.g. from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g. an X2 interface in the case of LTE.

A carrier may comprise a continuous or discontinuous radio frequency bandwidth and/or frequency distribution, and/or may carry, and/or be utilized or utilizable for transmitting, information and/or signals, in particular communication data. It may be considered that a carrier is defined by and/or referred to and/or indexed according to for example a standard like LTE. A carrier may comprise one or more subcarriers. A set of subcarriers (comprising at least one subcarrier) may be referred to as carrier, e.g. if a common LBT procedure (e.g. measuring the total energy/power for the set) is performed for the set. A channel may comprise at least one carrier. Accessing a carrier may comprise transmitting on the carrier. If accessing a carrier is allowed, this may indicate that transmission on this carrier is allowed.

A storage medium may generally be computer-readable and/or accessible and/or readable by control circuitry (e.g., after connecting it to a suitable device or interface), and may comprise e.g. an optical disc and/or magnetic memory and/or a volatile or non-volatile memory and/or flash memory and/or RAM and/or ROM and/or EPROM and/or EEPROM and/or buffer memory and/or cache memory.

The terms "interval" and "period" may be used interchangeably throughout this disclosure.

An LAA node may be a radio node adapted for LAA.

Defining an LBT parameter, in particular a freeze period, may comprise determining the parameter.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

| Abbreviation | Explanation |
| --- | --- |
| CCA | Clear Channel Assessment |
| DCF | Distributed Coordination Function |
| DIFS | DCF Inter-frame Spacing |
| DL | Downlink |
| DRS | Discovery Reference Signal |
| eNB | evolved NodeB, base station |
| TTI | Transmission-Time Interval |
| LAA | Licensed Assisted Access |
| LBT | Listen Before Talk |
| PDCCH | Physical Downlink Control Channel |
| PIFS | PCF Inter-frame Spacing |
| PUSCH | Physical Uplink Shared Channel |
| QCI | QoS Class Identifier |
| QoS | Quality of Service |
| SCell | Secondary Cell |
| SIFS | Short Inter-frame Spacing |
| UE | User Equipment |
| UL | Uplink |

LIST OF REFERENCE NUMERALS

10 Radio node
20 Control circuitry
22 Radio circuitry
24 Antenna Circuitry

What is claimed is:

1. A method of operation by a radio node configured for operation in a wireless communication network, the method comprising performing a load-based Listen-Before-Talk (LBT) procedure by:
setting a Clear Channel Assessment (CCA) budget as a function of monitored congestion on a carrier of the wireless communication network, wherein the carrier resides within a radio spectrum shared by the wireless communication network and another wireless communication network and is organized timewise into successive subframes, each subframe containing a defined number of symbol times, wherein the CCA budget comprises a designated number of contiguous symbol times within each subframe; and executing an extended CCA procedure by:
performing CCA procedures repeatedly over as many subframes as are needed to reach a counted number of CCA procedures equal to a count value, based on performing CCA procedures only within the CCA budget of each such subframe, and by counting only successful CCA procedures; and beginning a data transmission in the subframe in which the counted number of CCA procedures reaches the count value;
wherein beginning the data transmission in the subframe in which the counted number of CCA procedures reaches the count value comprises initiating the data transmission without first transmitting a channel-capture signal.

2. The method of claim 1, wherein beginning the data transmission in the subframe in which the counted number of CCA procedures reaches the count value comprises initiating the data transmission without first transmitting a channel-capture signal if the count value is reached coincident with one of one or more designated symbol times constituting a transmit start time, and otherwise initiating the data transmission by first transmitting the channel-capture signal and then transmitting data upon reaching one of the one or more designated symbol times constituting the transmit start time.

3. The method of claim 2, further comprising setting the transmit start time as a function of a transmission mode of the radio node.

4. The method of claim 1, wherein setting the CCA budget as a function of the monitored congestion on the carrier comprises adjusting the size of the CCA budget as a function of the monitored congestion.

5. The method of claim 4, wherein adjusting the size of the CCA budget as a function of the monitored congestion comprises decreasing or increasing the CCA budget responsive to the level of collisions experienced by the radio node on the carrier.

6. The method of claim 5, further comprising adjusting the size of the CCA budget in further dependence on a starvation condition of the radio node, such that the CCA budget is increased, or at least not further reduced as a function of the monitored congestion, responsive to the radio node deeming itself to be starving for access to the carrier.

7. The method of claim 1, further comprising setting the count value by randomly selecting a value from a defined range of positive integers.

8. A radio node configured for operation in a wireless communication network, the radio node comprising:
radio circuitry configured for sending and receiving wireless signals on one or more carriers of the wireless communication network; processing circuitry operatively associated with the radio circuitry and arranged to perform a load-based Listen-Before-Talk (LBT) procedure, based on being configured to:
set a Clear Channel Assessment (CCA) budget as a function of monitored
congestion on a carrier of the wireless communication network, wherein the carrier resides within a radio spectrum shared by the wireless communication network and another wireless communication network and is organized timewise into successive subframes, each subframe containing a defined number of symbol times, and wherein the CCA budget comprises a designated number of contiguous symbol times within each subframe; and
execute an extended CCA procedure, based on being configured to:
perform CCA procedures repeatedly over as many subframes as are needed to reach a counted number of CCA procedures equal to a count value, based on performing CCA procedures only within the CCA budget of each such subframe, and by counting only successful CCA procedures;
and begin a data transmission in the subframe in which the counted number of CCA procedures reaches the count value;
wherein beginning the data transmission in the subframe in which the counted number of CCA procedures reaches the count value comprises initiating the data transmission without first transmitting a channel-capture signal.

9. The radio node of claim 8, wherein the processing circuitry is configured to begin the data transmission in the subframe in which the counted number of CCA procedures reaches the count value by initiating the data transmission without first transmitting a channel-capture signal if the count value is reached coincident with one of one or more designated symbol times constituting a transmit start time, and otherwise initiating the data transmission by first transmitting the channel-capture signal and then transmitting data upon reaching one of the one or more designated symbol times constituting the transmit start time.

10. The radio node of claim 8, wherein the processing circuitry is configured to set the transmit start time as a function of a transmission mode of the radio node.

11. The radio node of claim 8, wherein the processing circuitry is configured to set the CCA budget as a function of the monitored congestion on the carrier by adjusting the size of the CCA budget as a function of the monitored congestion.

12. The radio node of claim 11, wherein the processing circuitry is configured to adjust the size of the CCA budget as a function of the monitored congestion by decreasing or increasing the CCA budget responsive to the level of collisions experienced by the radio node on the carrier.

13. The radio node of claim 12, wherein the processing circuitry is configured to adjust the size of the CCA budget in further dependence on a starvation condition of the radio node, such that the CCA budget is increased, or at least not further reduced as a function of the monitored congestion, responsive to the processing circuitry deeming the radio node to be starving for access to the carrier.

14. The radio node of claim 8, wherein the processing circuitry is configured to set the count value to be used for the extended CCA procedure by randomly selecting a value from a defined range of positive integers.

* * * * *